United States Patent
Yamauchi et al.

(10) Patent No.: US 6,871,969 B2
(45) Date of Patent: Mar. 29, 2005

(54) SPEED REDUCER AND ELECTRIC RETRACTABLE REARVIEW MIRROR EQUIPPED WITH THE SPEED REDUCER

(75) Inventors: Kazunari Yamauchi, Shizuoka (JP); Takeshi Morioka, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 308 days.

(21) Appl. No.: 10/174,997

(22) Filed: Jun. 20, 2002

(65) Prior Publication Data

US 2003/0011907 A1 Jan. 16, 2003

(30) Foreign Application Priority Data

Jul. 12, 2001 (JP) ........................................ 2001-211940

(51) Int. Cl.[7] .......................... G02B 5/08; G02B 7/182; B60R 1/06
(52) U.S. Cl. ........................ 359/841; 359/872; 359/877
(58) Field of Search ............................... 359/841, 872, 359/877, 873, 876

(56) References Cited

U.S. PATENT DOCUMENTS

| 4,158,483 A | * | 6/1979 | Fisher et al. |
| 4,657,362 A | | 4/1987 | Suzuki |
| 4,786,156 A | * | 11/1988 | Kotani et al. |
| 4,787,726 A | * | 11/1988 | Hendricks |
| 4,832,477 A | * | 5/1989 | Torii et al. |
| 4,919,526 A | * | 4/1990 | Umekawa et al. |
| 4,981,349 A | * | 1/1991 | Tamiya et al. |
| 5,369,530 A | * | 11/1994 | Yamauchi et al. |
| 5,579,178 A | * | 11/1996 | Mochizuki |
| 5,703,731 A | * | 12/1997 | Boddy et al. |
| 5,781,354 A | * | 7/1998 | Sakata |
| 6,130,514 A | * | 10/2000 | Oesterholt et al. |
| 6,322,221 B1 | * | 11/2001 | van de Loo |
| 6,679,610 B2 | * | 1/2004 | Yamauchi |

FOREIGN PATENT DOCUMENTS

| DE | 299 18 656 | | 2/2000 |
| JP | 63082844 | * | 4/1988 |
| WO | WO 91/04172 | | 4/1991 |
| WO | WO 00/41914 | | 7/2000 |

* cited by examiner

Primary Examiner—Ricky D. Shafer
(74) Attorney, Agent, or Firm—Oblon, Spivak, McClelland, Maier & Neustadt, P.C.

(57) ABSTRACT

A speed reducer including a gear box having a first frame and a second frame combined together, an input gear fixed on an input shaft being rotated by a driving force, an output gear fixed on an output shaft, an intermediate shaft, intermediate gears fixed on the intermediate shaft to reduce a speed of rotation of the input gear for being transmitted to said output gear, wherein the input shaft and the intermediate shaft are rotatably supported by the first frame for always maintaining the length between each core of the input shaft and the intermediate shaft as a predetermined length.

2 Claims, 4 Drawing Sheets

SPEED REDUCER AND ELECTRIC RETRACTABLE REARVIEW MIRROR EQUIPPED WITH THE SPEED REDUCER

BACKGROUND OF THE INVENTION

1. Field of the Invention

The present invention relates to a speed reducer capable of steadily and smoothly transmitting a driving force from an input shaft to an output shaft after the driving force is provided on the input shaft.

The present invention also relates to an electric retractable rearview mirror equipped with the speed reducer for using in an automobile.

2. Prior Art

Conventionally, an electric retractable rearview mirror is mounted on an automobile and the like such that a driving force provided by a motor can cause a mirror body to be retracted and be returned to an original position for usage.

Above-mentioned rearview mirror is retracted and returned to an original position as a following way. As shown in FIG. 3, a motor 11 is mounted on inside the mirror body. The driving force provided by the motor 11 is transmitted to a shaft 10 (an output shaft) fixed on a base member 22 attached to a vehicle body. Then, the mirror body turns on the shaft 10 since the mirror body is rotatably attached to the shaft 10.

The driving force provided by the motor 11 is transmitted to the shaft 10 via the speed reducer, wherein plural gears are engaged with each other. For example, a speed reducer 31 shown in FIG. 4 can be used as aforementioned speed reducer.

The speed reducer 31 comprises a gear box 32 having a first frame 33 and a second frame 34 combined together, wherein a primary worm 35, a primary wheel worm 37a, a second stage worm 37b, a second stage wheel worm 39a, a spur gear 39b, and a final stage spur gear 40 coupled to output shaft 41 are provided.

However, an input shaft 36 is supported by both input shaft-holding portions. One is an input shaft-holding portion 33a provided in the first frame 33. The other one is an input shaft-holding portion 34a provided in the second frame 34. Accordingly, there had been a case such that the input shaft 36 is slantingly fixed to both of these shaft-holding portions when the first frame 33 and the second frame 34 are combined together. Additionally, when these frames 33 and 34 are combined together, the inconvenience had been arisen as following ways. When an interval between the input shaft-holding portions 33a and 34a is narrower than a length of the input shaft 36, a rotation of the input shaft 36 is suffocated due to being tightly supported. On the other hand, when the interval between input shaft-holding portions 33a and 34a is wider than a length of the input shaft 36, a rotation of the input shaft 36 is waggled due to being loosely supported.

Furthermore, an intermediate shaft 38 is supported by two intermediate shaft-holding portions 34b and 34b provided in the second frame 34. Accordingly, the err caused by incorrectly combining the first frame 33 and the second frame 34 together accurately corresponds to a length moved from a length L (shown in FIG. 2) between each core of the input shaft 36 and the intermediate shaft 38. When said length L between each core of the input shaft 36 and the intermediate shaft 38 is changed from a predetermined length, this has inevitably an influence on an accuracy for engaging the primary worm 35 with the primary wheel worm 37a each other. Accordingly, the driving force can not be steadily and smoothly transmitted. Consequently, a problem had been arisen such that a noise is made or a gear is abnormally worn away.

Sophisticated engaging accuracy is needed when gears are engaged with each other, especially for high-speed rotation. However, when two frames are combined together to form aforementioned speed reducer, there was a limit to improve the accuracy for engaging two gears with each other since it was hard task to dissolve the err caused by incorrectly combining the first frame 33 and the second frame 34 together.

Additionally, above-mentioned inconvenience arises from not only said speed reducer used in an electric retractable rearview mirror but also from the speed reducer having plural frames combined together.

Based on above-mentioned point of view, the object of the present invention is to provide the speed reducer capable of always steadily and smoothly transmitting the driving force regardless of the err caused by incorrectly combining frames to form a gear box. Further, another object of the present invention is to provide the electric retractable rearview mirror capable of always steadily and smoothly being retracted and returned to an original position.

SUMMARY OF THE INVENTION

A speed reducer is provided so as to be comprised by the gear box having the first frame and the second frame combined together, the input gear fixed on the input shaft being rotated by the driving force, and the output gear fixed on the output shaft. Said input shaft and said output shaft are supported in following ways. These two shafts are rotatably supported by said gearbox respectively to reduce a speed of rotation of said input gear for being transmitted to said output gear. Herein, both ends of said input shaft are rotatably supported by input shaft-holding portions provided in said first frame, on the other hand, said output shaft is rotatably supported by the output shaft-holding portion provided in said second frame.

Accordingly, following result is gained in the speed reducer having aforementioned constitution. The first frame and the second frame are combined together under the condition that both ends of the input shaft are supported by the first frame. Therefore, there is no inconvenience relates to err caused by incorrectly combining these frames together such that the input shaft is slanted, rotation of the input shaft is suffocated due to being supported under the condition that the input shaft is tightly pressed into an axial direction, and rotation of the input shaft is waggled due to being supported under the condition that the input shaft is loosely fixed.

Specifically, the input shaft is supported by the first frame under the best condition for rotation such that the shaft is always in a predetermined direction. Furthermore, the input shaft having the input gear fixed thereon is always rotated under the stable condition. Accordingly, noise problem and abnormal abrasion of gear can be reduced.

Consequently, the driving force can be steadily and smoothly transmitted.

The speed reducer is provided so as to be comprised by the gearbox having the first frame and the second frame combined together, the input gear fixed on the input shaft being rotated by the driving force, and the output gear fixed on the output shaft, one or more intermediate shafts, one or more intermediate gears fixed on said intermediate shaft. Herein, said one or more intermediate gears reduces a speed of rotation of said input gear for being transmitted to said output gear. Besides, said input shaft, said output shaft, and said intermediate shafts are supported in following ways. All of them are rotatably supported by said gearbox respectively. Herein, both ends of said input shaft are rotatably supported by the input shaft-holding portions provided in said first frame, and both ends of one of said plural intermediate shafts having the intermediate gear fixed thereon engaging with said input gear are rotatably supported by the intermediate shaft-holding portions provided in said first frame, and said output shaft is rotatably supported by the output shaft-holding portion provided in said second frame.

Accordingly, following result is gained in the speed reducer having aforementioned constitution. Both the input shaft and one of plural intermediate shafts having the intermediate gear fixed thereon engaging with the input gear are supported by the first frame. Therefore, the length between each core of the input shaft and the output shaft can always be maintained as a predetermined length regardless of accuracy for combining the first frame and the second frame together.

Specifically, a fastest-rotating input gear and the intermediate gear adjacent to said input gear are always engaged with each other under the suitable condition regardless of accuracy for combining the first frame and the second frame together. Accordingly, noise problem and abnormal abrasion of gear can be reduced.

Consequently, the driving force can be steadily and smoothly transmitted.

The speed reducer is provided so as to be comprised by the gearbox having the first frame and the second frame combined together, the primary worm fixed on the input shaft being rotated by the driving force, a final stage wheel worm fixed on the output shaft, and intermediate gears fixed on said intermediate shaft. Herein, said intermediate gears reduce a speed of rotation of said primary worm for being transmitted to said final stage wheel worm. Besides, said input shaft, said output shaft, and said intermediate shafts are supported in following ways. All of them are rotatably supported by said gearbox respectively. Herein, both ends of said input shaft are rotatably supported by the input shaft-holding portions provided in said first frame, said intermediate gears are composed of the primary wheel worm engaging with said primary worm and a second stage worm engaging with said final stage wheel worm, said primary stage wheel worm and said second stage worm are fixed on the same intermediate shaft being perpendicular to said input shaft, both ends of said intermediate shaft are rotatably supported by the intermediate shaft-holding portions provided in said first frame, and said output shaft are perpendicular to said intermediate shaft for being rotatably supported by the output shaft-holding portion provided in said second frame.

Accordingly, following result is gained in the speed reducer having aforementioned constitution. Both the input shaft and the intermediate shaft are supported by the first frame. Therefore, the length between each core of the input shaft and the intermediate shaft can always be maintained as a predetermined length.

Specifically, a fastest-rotating primary worm and the primary wheel worm adjacent to said primary worm are always engaged with each other under the best condition regardless of accuracy for combining the first frame and the second frame together. Accordingly, noise problem and abnormal abrasion of gear can be reduced.

Consequently, the driving force can be steadily and smoothly transmitted.

Additionally, the primary worm and the primary wheel worm are engaged with each other to form one worm gear, on the other hand, the second stage worm and the final stage wheel worm are engaged with each other to form another worm gear.

Consequently, even though rotational force is provided on the output shaft, this force is not transmitted to the input shaft.

An electric retractable rearview mirror is constituted in such manner that a mirror body with built-in aforementioned speed reducer is fixed on a base member attached to the vehicle body. Furthermore, said input shaft portion receives the driving force from the motor mounted on said first frame, on the other hand, an end portion of said output shaft is fixed on said base member.

Accordingly, following result is gained in the electric rearview mirror having aforementioned constitution. The driving force provided by the motor is transmitted via aforementioned speed reducer.

Consequently, the mirror body is always steadily and smoothly retracted and returned to an original position for usage.

DESCRIPTION OF THE PREFERRED EMBODIMENTS

Now the preferred embodiment of a speed reducer and an electric retractable rear view mirror equipped with a speed reducer with regard to the present invention is explained in detail. Hereinafter, the speed reducer is explained as one example when said speed reducer is applied to the electric retractable rearview mirror. However, an application of said speed reducer is not restricted to said electric retractable rearview mirror.

Figure 1:
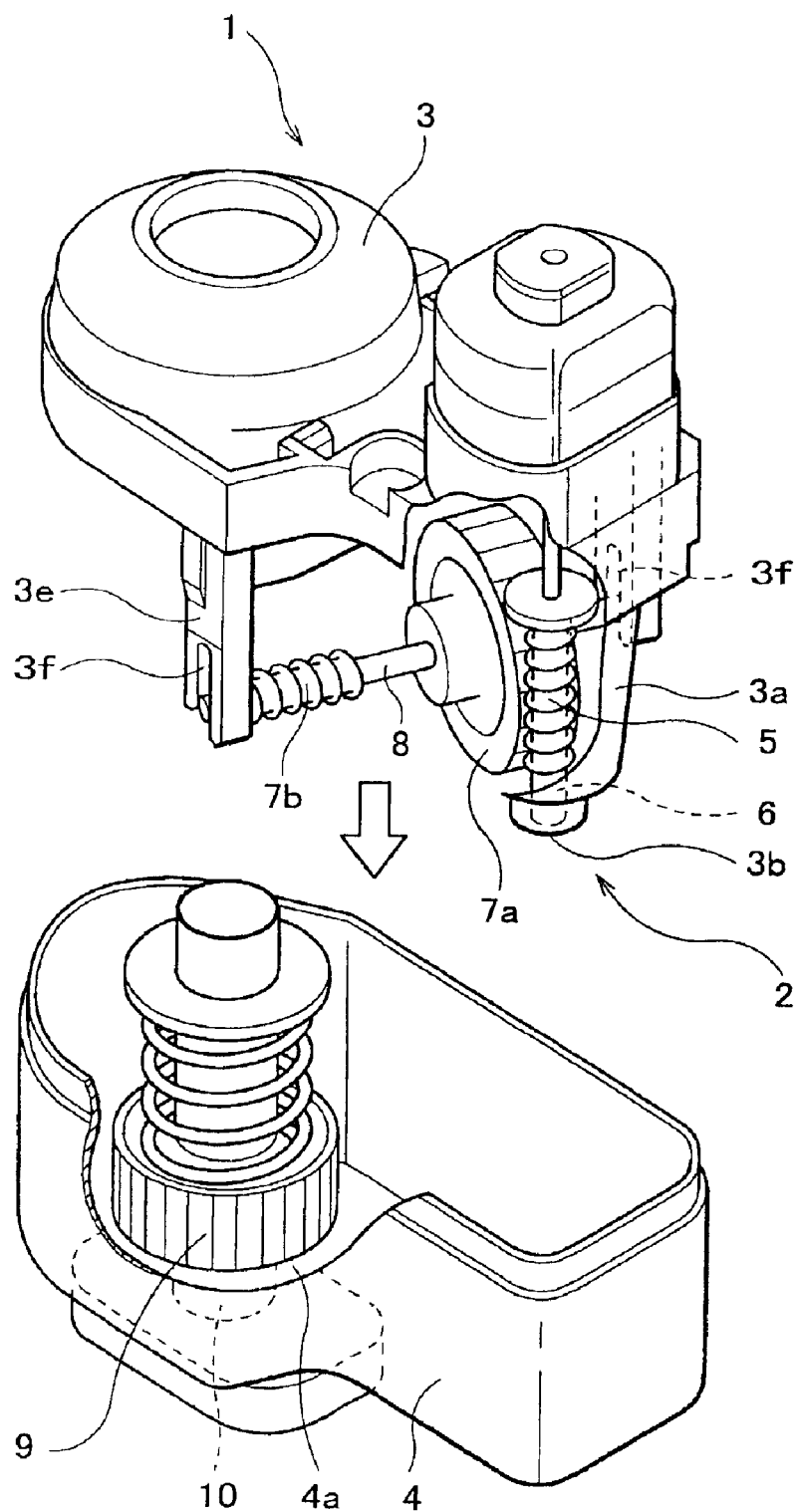
FIG. 1 is a perspective view showing the embodiment of the speed reducer with regard to the present invention.
Figure 2:
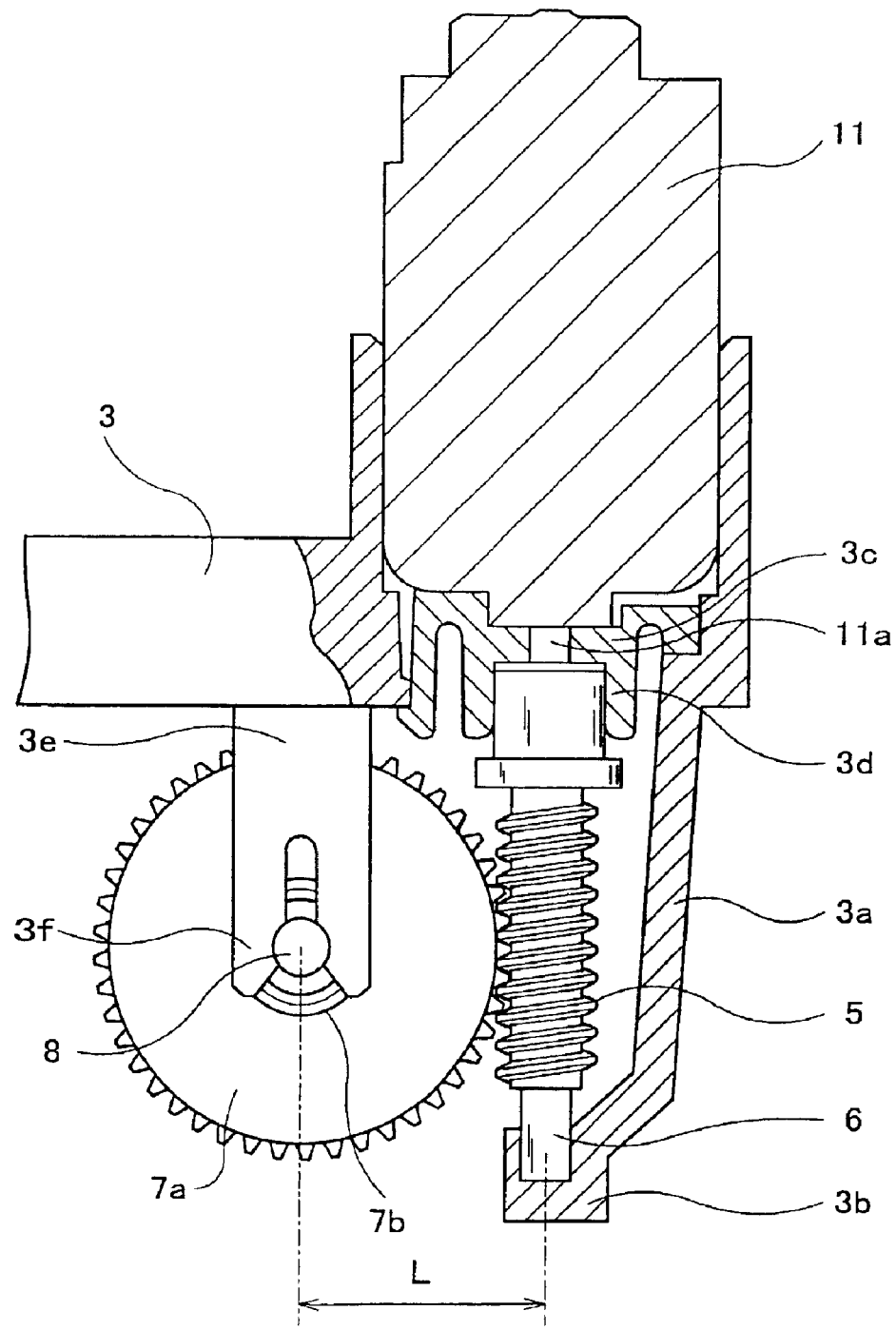
FIG. 2 is an enlarged cross sectional view of a main part of the speed reducer in FIG. 1.

FIG. 1 is a perspective view of the speed reducer with regard to the present invention. FIG. 2 is an enlarged cross sectional view of a main part of the first frame of the speed reducer shown in FIG. 1. A speed reducer 1 comprises a gearbox 2 having a first frame 3 and a second frame 4 combined together, wherein an input gear 5, intermediate gears 7a, 7b, and an output gear 9 are provided.

An input shaft 6 having the input gear 5 fixed thereon and the intermediate shaft 8 having intermediate gears 7a, 7b fixed thereon are rotatably supported by the first frame 3. Specifically, as shown in FIG. 2, the input shaft 6 is rotatably supported by the input shaft-holding portions 3b, 3d provided in the first frame 3. The intermediate shaft 8 is rotatably supported by the intermediate shaft-holding portions 3f, 3f provided in the first frame 3. Herein, according to the present embodiment, input shaft-holding portions 3b, 3d, and the intermediate shaft-holding portions 3f, 3f are provided as following ways. The input shaft-holding portion 3b is provided on a lower portion of a protrusion 3a protruding to below from the first frame 3. On the other hand, the input shaft-holding portion 3d is provided on a bush 3c mounted on the first frame 3. Furthermore, the intermediate shaft-holding portions 3f, 3f are provided on a below portion of protrusions 3e, 3e protruding to below from the first frame 3. Herein, according to the present embodiment, the input shaft 6 is vertically provided, on the other hand, the intermediate shaft 8 is horizontally provided in such manner that these two shafts are perpendicular to each other.

An output shaft 10 having the output gear 9 fixed thereon is rotatably supported by an output shaft-holding portion 4a of the second frame 4. Herein, according to the present embodiment, the output shaft 10 is vertically provided.

Besides, each configuration of the first frame 3 and the second frame 4 is not restricted to a configuration shown in the view of the embodiment. But they can be properly formed into an appropriate configuration depending upon a size or a number of supporting gears, additionally, a place for a use of the speed reducer 1. Additionally, they are made of synthetic reign or steel.

According to the present embodiment, the input gear 5 is composed of a worm (a primary stage worm), on the other hand, the intermediate gear 7a engaging with the input gear 5 is composed of a wheel worm (a primary wheel worm). The input gear 5 and the intermediate gear 7a are engaged with each other to form one worm gear wherein the intermediate gear 7a can be rotated by the input gear 5a, but not vice versa. At the same time, the intermediate gear 7b is composed of a worm (a second stage worm), on the other hand, the output gear 9 engaging with the intermediate gear 7b is composed of a wheel worm (a final stage wheel worm). The intermediate gear 7b and the output gear 9 are engaged with each other to form another worm gear wherein the output gear 9 can be rotated by the intermediate gear 7b, but not vice versa.

Additionally, both configuration and number of individual gear is also invariable to gain a necessary speed-reducing ratio without being restricted to aforementioned configuration and number. Herein, individual gear is made of synthetic resin or steel. Furthermore, gear and shaft can be made as either way in such manner that they can be integrally molded or they can be individually molded for joining together to be fixed.

What is more, a motor 11 providing the driving force to the input shaft 6 is fixed on the first frame 3, wherein a motor shaft 11a is connected with the input shaft 6.

Both the first frame 3 and the second frame 4 having aforementioned structure are combined together to form the speed reducer 1.

When the first frame 3 and the second frame 4 are combined together, the intermediate gear 7b and the output gear 9 are engaged with each other. Accordingly, the driving force provided on the input shaft 6 can be transmitted to the output shaft 10 via the input gear 5, the intermediate gear 7a, 7b, and the output gear 9.

Additionally, the first frame 3 and the second frame 4 are combined together under the condition that both ends of the input shaft 6 are supported by the first frame 3.

Accordingly, there is no inconvenience relates to err caused by incorrectly combining these frames together such that the input shaft 6 is slanted, a rotation of the input shaft 6 is suffocated due to being supported under the condition that the input shaft 6 is tightly pressed into an axial direction, and a rotation of the input shaft 6 is waggled due to being supported under the condition that the input shaft 6 is loosely fixed.

Specifically, the input shaft 6 is supported by the first frame under the best condition for rotation such that the shaft 6 is always in a predetermined direction. Furthermore, the input shaft 6 having the input gear fixed thereon is always rotated under the stable condition. Accordingly, noise problem and abnormal abrasion of gear can be reduced. Consequently, the driving force can be steadily and smoothly transmitted. Furthermore, the same effects as that of the input shaft 6 can be gained in also the intermediate shaft 8.

Moreover, the intermediate shaft 8 is also supported by the first frame 3. Accordingly, the length between each core of the input shaft 3 and the intermediate shaft 8 can always be maintained as a predetermined length regardless of accuracy for combining the first frame 3 and the second frame 4 together. Specifically, the input gear 5 and the intermediate gear 7a are always engaged with each other under the best condition regardless of accuracy for combining the first frame 3 and the second frame 4 together. Accordingly, noise problem and abnormal abrasion of gear can be reduced. Consequently, the driving force provided on the input shaft 6 can be steadily and smoothly transmitted.

What is more, as described above, according to the present embodiment, the input gear 5 and the intermediate gear 7a are engaged with each other to form one worm gear. On the other hand, the intermediate gear 7b and the output gear 9 are engaged with each other to form another worm gear. Accordingly, even though a rotation force is provided on the output shaft, this force is not transmitted to the input shaft 6.

Besides, one example was described as the aforementioned embodiment such that the input shaft 6 and the intermediate shaft 8 are supported by the first frame 3.

However, when two or more intermediate shafts exist in the first frame 3 as example, these two or more intermediate shafts can be supported by the first frame 3. Or some of intermediate shafts can be supported by the second frame 4. In the occasion like this, when more number of fast rotating gear shafts are supported by the first frame 3, a noise problem and abnormal abrasion of gear can be more reduced. Consequently, the driving force provided on the input shaft 6 can be steadily and smoothly transmitted to the output shaft 10.

Figure 3:
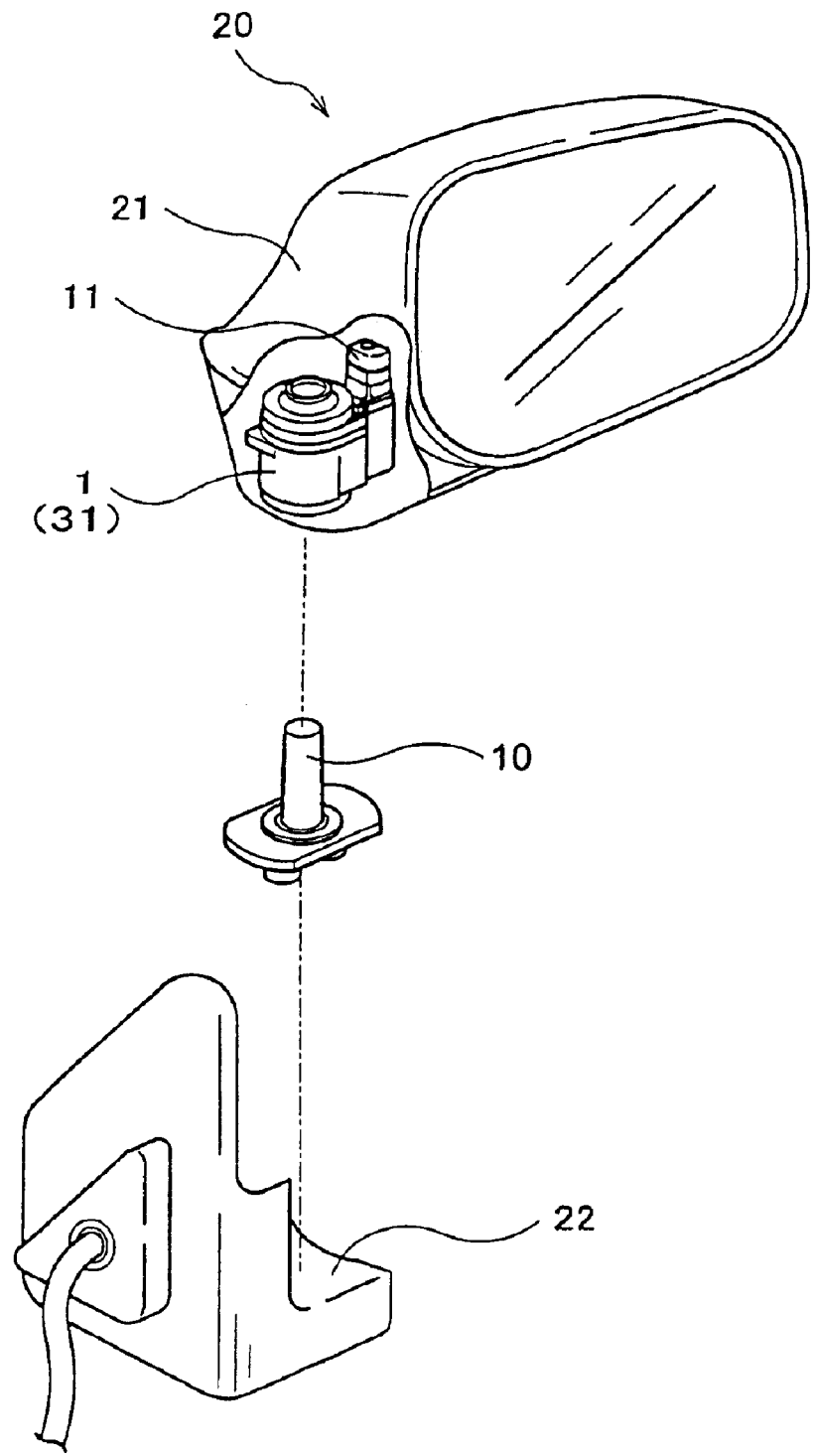
FIG. 3 is a perspective view showing an example that the speed reducer of FIG. 1 is applied to the electric retractable rearview mirror.
Figure 4:
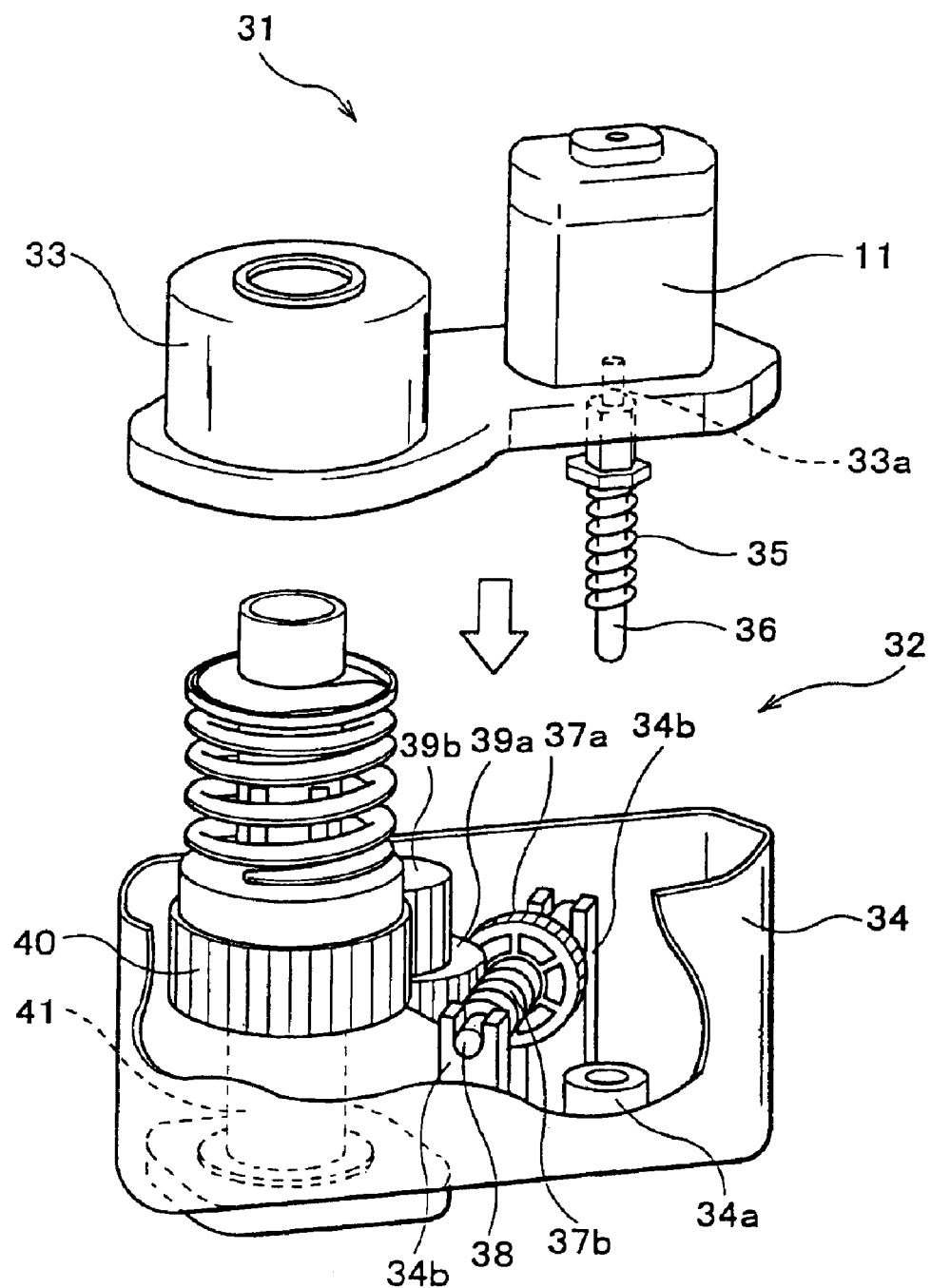
FIG. 4 is a perspective view showing a conventional speed reducer.

Then, one example will be now described as such case that aforementioned speed reducer is applied to the electric retractable rearview mirror of automobile. FIG. 3 is a perspective view showing the example such that the speed reducer regarding the present invention is applied to the electric retractable rearview mirror. Herein, the electric retractable rearview mirror includes other elements except for the speed reducer. However, a following explanation will mainly aim at the speed reducer for omitting the explanation of other elements.

An electric retractable rearview mirror 20 comprises a mirror body 21, a speed reducer being fixed into the mirror body 21 so as not to be moved, and the motor 11 attached to the speed reducer 1. A lower end portion of the output shaft 10 is fixed on a base member 22 fixed to a vehicle body (not shown).

The electric retractable rearview mirror 20 is constituted in aforementioned manner. As shown in FIG. 1, when the driving force is provided on the input shaft 6 by the motor 11, the driving force is transmitted to the output shaft 10 via the input gear 5, the intermediate gears 7a, 7b, and the output gear 9. However, since a lower end portion of the output shaft 10 is fixed on the base member 22, the gearbox 2 is turned on the output shaft 10.

Specifically, the mirror body 21 having the gearbox fixed therein turns on the output shaft 10. Controlling a rotational direction of the motor 11 causes the mirror body 21 to be not only electrically retracted but also be electrically returned to an original position for usage. Herein, the input gear 5, the intermediate gears 7a, 7b, and the output gear 9 are provided in the speed reducer 1.

The input gear 5 and the intermediate gear 7a are engaged with each other to form one worm gear, wherein the intermediate gear 7a can be rotated by the input gear 5, but not vice versa. On the other hand, the intermediate gear 7b and the output gear 9 are engaged with each other to form another worm gear, wherein the output gear 9 can be rotated by the intermediate gear 7b, but not vice versa. Accordingly, even though a wind pressure and the like are exerted on the mirror body 21 to be turned on the output shaft 10, the rotational force is not transmitted to the input shaft 6. Consequently, the mirror body 21 can not be easily turned.

According to aforementioned electric retractable rearview mirror, the driving force provided by the motor 11 can be transmitted to the output shaft 10 via the speed reducer 1. Consequently, the mirror body 21 can be steadily and smoothly turned without abnormal noise.

According to the speed reducer with regard to the present invention, the first frame and the second frame are combined together under the condition that both ends of the input shaft are supported by the first frame. Accordingly, there is no inconvenience relates to err caused by incorrectly combining these frames together such that the input shaft is slanted, a rotation of the input shaft is suffocated due to being supported under the condition that the input shaft is tightly pressed into an axial direction, and a rotation of the input shaft is waggled due to being supported under the condition that the input shaft is loosely fixed.

Specifically, the input shaft is supported by the first frame under the best condition for rotation such that the shaft is always in a predetermined direction. Furthermore, the input shaft having the input gear fixed thereon is always rotated under the stable condition. Accordingly, noise problem and abnormal abrasion of gear can be reduced. Consequently, the driving force can be steadily and smoothly transmitted.

Furthermore according to the speed reducer described herein, both the input shaft and one of plural intermediate shafts having the intermediate gear fixed thereon engaging with the input gear are supported by the first frame. Accordingly, the length between each core of the input shaft and the output shaft can always be maintained as a predetermined length regardless of accuracy for combining the first frame and the second frame together.

Specifically, a fastest-rotating input gear and the intermediate gear adjacent to said input gear are always engaged with each other under the suitable condition regardless of accuracy for combining the first frame and the second frame together. Accordingly, noise problem and abnormal abrasion of gear can be reduced. Consequently, the driving force can be steadily and smoothly transmitted.

Additionally, according to the speed reducer described herein, the primary stage worm and the primary wheel worm are engaged with each other to form one worm gear, on the other hand, the second stage worm and the final stage wheel worm are engaged with each other to form another worm gear.

Accordingly, even though a rotational force is provided on the output shaft, this force is not transmitted to the input shaft.

Furthermore, according to the electric retractable rearview mirror equipped with the speed reducer of the present invention, the driving force provided by the motor can be steadily and smoothly transmitted to the output shaft.

Consequently, the mirror body having the gearbox fixed therein can steadily and smoothly be not only retracted but also be returned to an original position for usage.

What is claimed is:

1. An electric retractable rearview mirror comprising:
   a mirror body fixed on a base member attached to a vehicle body, said mirror body including a speed reducer, said speed reducer including:
      a gearbox having a first frame and a second frame combined together, said gearbox configured to rotate with respect to said base member;
      a motor mounted on said first frame;
      an input gear fixed on an input shaft being rotated by a driving force, both ends of the input shaft rotatably supported by input shaft-holding portions provided in the first frame;
      an output gear fixed on an output shaft, said output shaft rotatably supported by an output shaft-holding portion provided in said second frame, an end portion of said output shaft fixed on said base member;
      at least one intermediate shaft, both ends of said at least one intermediate shaft rotatably supported by intermediate shaft-holding portions provided in said first frame; and
      at least one intermediate gear fixed on the at least one intermediate shaft, said at least one intermediate gear configured to reduce a speed of rotation of said input gear transmitted to the output gear.

2. An electric retractable rearview mirror comprising:
   a mirror body fixed on a base member attached to a vehicle body, said mirror body including a speed reducer, said speed reducer including:
      a gearbox having a first frame and a second frame combined together, said gearbox configured to rotate with respect to said base member;
      a motor mounted on said first frame;
      a primary stage worm fixed on an input shaft being rotated by a driving force, both ends of said input shaft rotatably supported by input shaft-holding portions provided in said first frame;
      a final stage wheel worm fixed on an output shaft, said output shaft rotatably supported by an output shall-holding portion provided in said second frame, an end portion of said output shaft fixed on said base member;
      an intermediate shall perpendicular to both said input shaft and said output shaft, both ends of said intermediate shall rotatably supported by intermediate shaft-holding portions provided in said first frame; and
      intermediate gears fixed on said intermediate shall configured to reduce a speed of rotation of said primary worm transmitted to said final stage wheel worm, said intermediate gears including a primary stage wheel worm engaging with said primary stage worm and a second stage worm engaging with said final stage wheel worm.

* * * * *